Patented Feb. 23, 1932

1,847,022

UNITED STATES PATENT OFFICE

MAX SCHMID, OF RIEHEN, NEAR BASEL, AND FRITZ STRAUB, OF BASEL, SWITZERLAND, ASSIGNORS TO SOCIETY OF CHEMICAL INDUSTRY IN BASLE, OF BASEL, SWITZERLAND

AZODYESTUFFS AND PROCESS OF MAKING SAME

No Drawing. Original application filed July 19, 1928, Serial No. 294,044, Patent No. 1,791,432, dated February 3, 1931, and in Switzerland July 26, 1927. Divided and this application filed August 26, 1929. Serial No. 388,613.

This application is a division of application Serial No. 294,044, filed July 19, 1928.

This invention relates to the manufacture of new dyestuffs by coupling an aromatic unsulfonated diazo-compound of the general formula

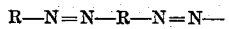

wherein the R's stand for aromatic nuclei of the benzene series, with pyrazolone derivatives of the general formula

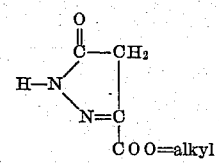

which are produced by the condensation of an oxalacetic acid ester with hydrazine. Such pyrazolone derivatives are for instance the methyl or the ethyl ester of the 5-pyrazolone-3-carboxylic acid.

The azo-dyestuffs thus obtained correspond with the general formula

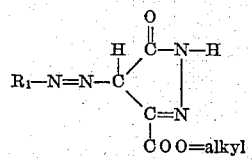

wherein $R_1$ means an aromatic unsulfonated diazo-compound of the general formula R—N=N—R wherein the R's stand for aromatic nuclei of the benzene series. The products are orange to brown powders which are insoluble in water, but soluble in various organic solvents with yellow to orange, red or brown colorations.

Among these compounds those are particularly valuable which derive from para-amino-azo-dyestuffs.

The following example illustrates the invention, the parts being by weight:—

Example 19.7 parts of amino-azo-benzene are as usual diazotized. The filtered diazo-solution is poured into a solution alkaline with sodium carbonate or acid with acetic acid of 15.6 parts of 5-pyrazolone-3-carboxylic acid ethyl ester. The dyestuff thus obtained is isolated by suction. Dried it forms an orange-yellow powder, dissolving in alcohol with an orange coloration, which may be employed for the dyeing of cellulose varnishes, such as Zapon varnishes, and the like. These materials are dyed in clear orange tints very fast to light. The formula of this dyestuff is:—

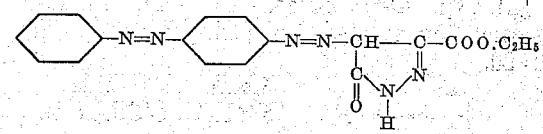

By employing other diazotized amino-azo-dyestuffs, such for example as amino-azo-toluene, or the coupling products from diazotized aniline and α-naphthylamine, diazotized p-chloraniline and meta-amino-para-cresol ether, and the like, there are obtained with the 5-pyrazolone-3-carboxylic acid ethyl ester varnishes having orange to brown tints. Similar products are obtained with the methyl or propyl ester of the pyrazolone.

What we claim is:—

1. The manufacture of azo-dyestuffs by coupling pyrazolones of the general formula

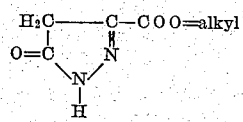

with an aromatic unsulfonated diazo-compound of the general formula R—N=N—R—N=N— wherein the R's stand for aromatic nuclei of the benzene series.

2. The manufacture of azo-dyestuffs by coupling the pyrazolone of the formula

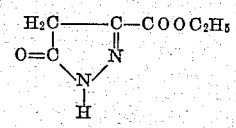

with diazotized amino-azo-benzene of the formula

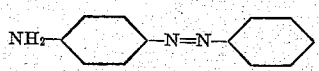

3. As new products the azo-dyestuffs corresponding with the general formula

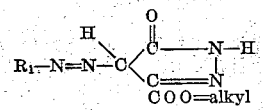

in which $R_1$ means an aromatic unsulfonated diazo-compound of the general formula R—N=N—R wherein the R's stand for aromatic nuclei of the benzene series, which products form orange to dark brown powders which dissolve in various organic solvents with orange, red or brown coloration.

4. As a new product the azo-dyestuff corresponding with the formula

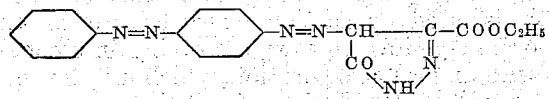

which product forms an orange powder which is insoluble in water but soluble in various organic solvents to solutions of orange coloration.

In witness whereof we have hereunto signed our names this 14th day of August, 1929.

MAX SCHMID.
FRITZ STRAUB.